UNITED STATES PATENT OFFICE.

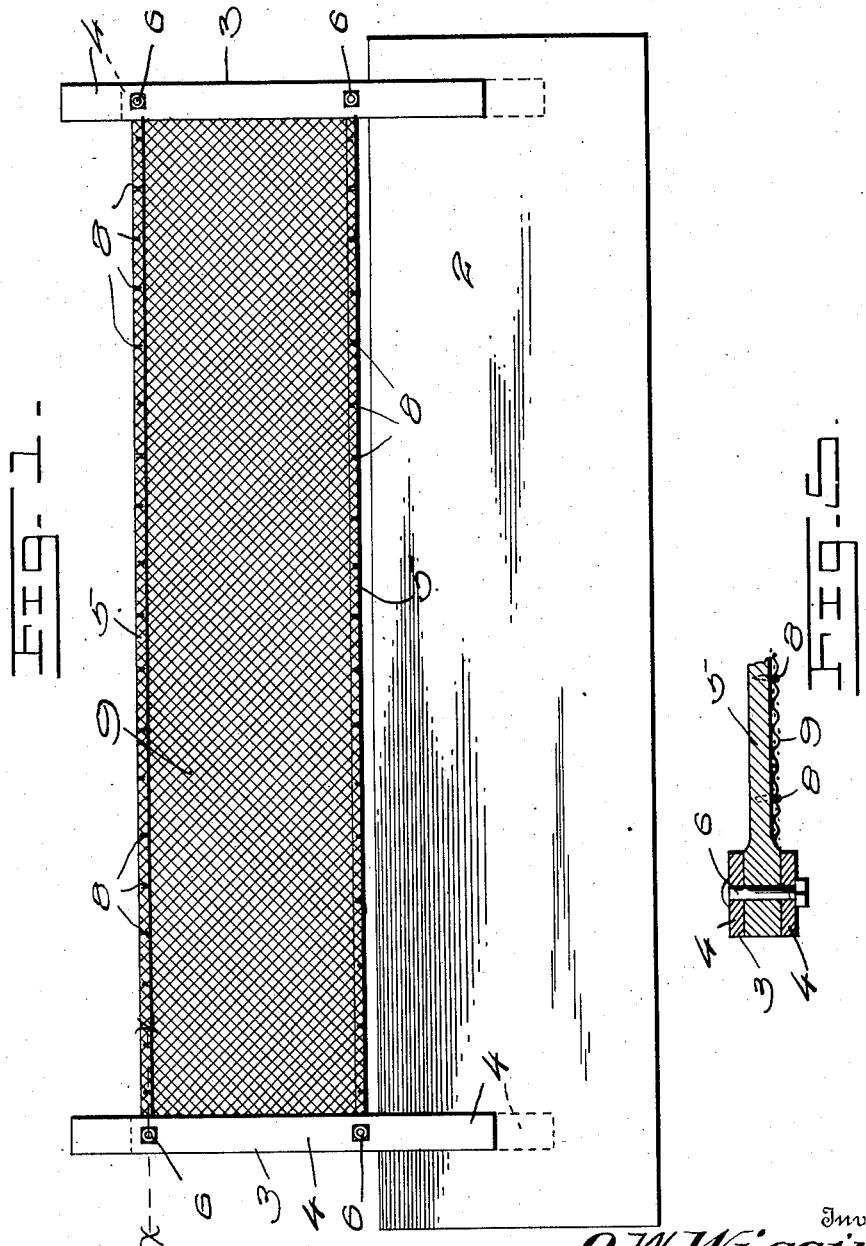

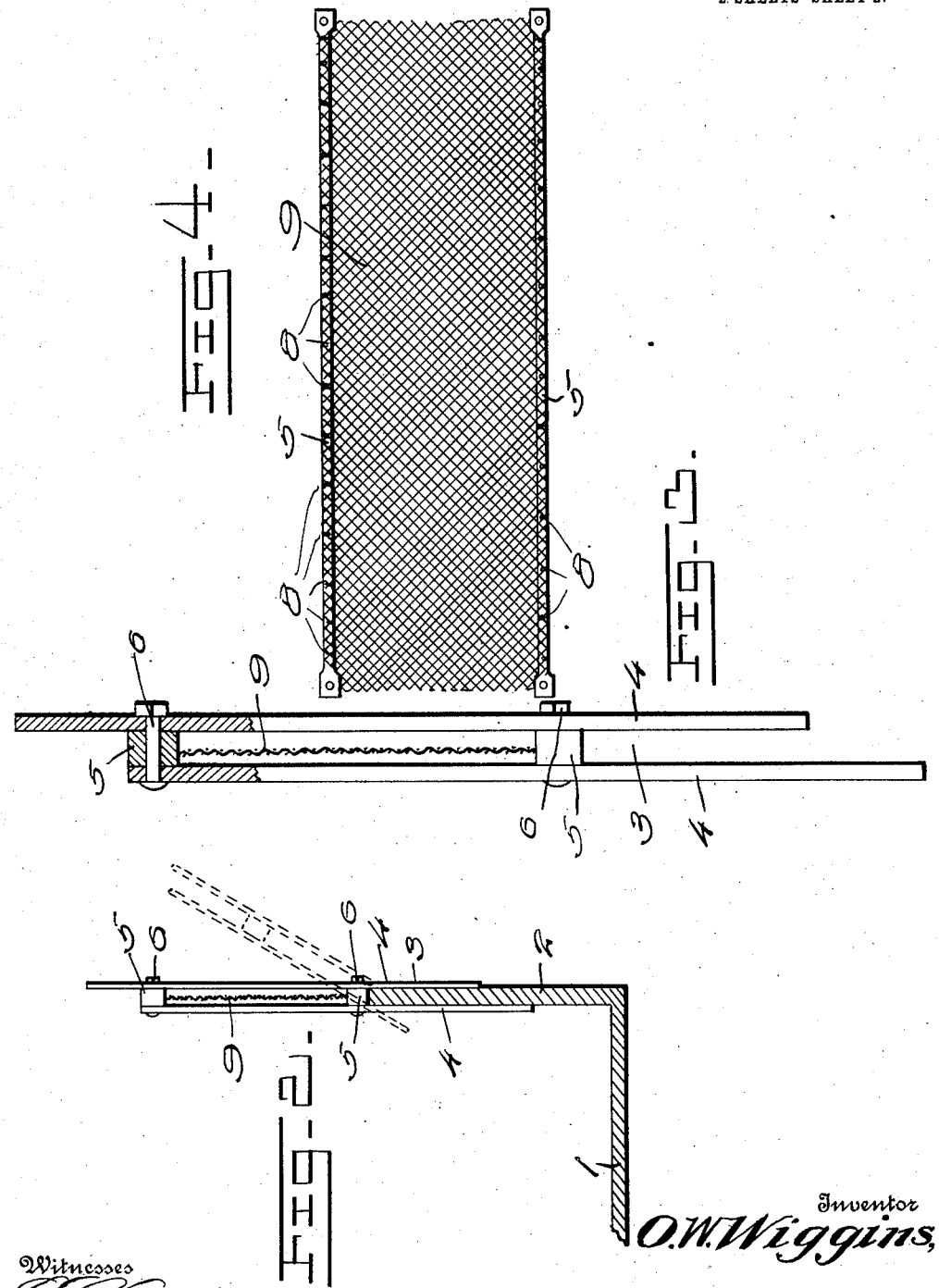

OSCAR W. WIGGINS, OF POMONA, KANSAS.

GRAIN-GUARD FOR WAGONS.

1,025,601.  Specification of Letters Patent.  Patented May 7, 1912.

Application filed April 23, 1910. Serial No. 557,116.

*To all whom it may concern:*

Be it known that I, OSCAR W. WIGGINS, a citizen of the United States, residing at Pomona, in the county of Franklin and State of Kansas, have invented certain new and useful Improvements in Grain-Guards for Wagons, of which the following is a specification.

My invention relates to grain guards for wagons, and more particularly to a detachable frame having a yielding striking surface.

The object of my invention is to provide a grain guard which may be readily secured to any ordinary wagon to serve as a grain guard thereon and which may with equal facility be detached from the wagon and may be folded and rolled up to occupy but little space when not in use.

Other objects and advantages will be apparent from the following description and it will be understood that changes in the specific structure shown and described may be made within the scope of the claim without departing from the spirit of the invention.

In the drawings: Figure 1 is a front elevation of my complete invention, Fig. 2 is an end view of the same as applied to the body of a wagon, the latter being in section, Fig. 3 is an enlarged end view of the frame with parts broken away, Fig. 4 is a front elevation of the guard with the cleats removed, Fig. 5 is an enlarged cross section taken on the line $x$—$x$ of Fig. 1.

Referring to the drawings 1 represents an ordinary wagon body and 2 one of the vertical side walls thereof to which my invention is readily and conveniently removably attached.

My invention consists of a frame composed of two vertical supports 3 forming the end members of the frame, said supports being each composed of two uprights 4 arranged in pairs and separated a suitable distance from one another by the longitudinal parallel bars 5 forming the upper and lower members of said frame, the several parts being rigidly secured together by means of bolts 6 passing through the ends of said bars 5 and through the spaced uprights 4. In securing the several parts togther in the manner described, one of the uprights of the support 3 projects a suitable distance above the upper longitudinal bar 5, which provides means over which the lines or reins leading from the harness carried by the animal may be passed for holding said lines in an elevated and convenient position. The uprights 4 are substantially the same length and by projecting one of the uprights above its opposite upright the lower end of the latter extends a suitable distance below the lower end of the former upright, which provides a convenient and practical construction for properly guiding the frame in its proper position upon the side 2 of the wagon, as shown in dotted lines in Fig. 2 of the drawings, by simply holding the frame in the position shown and allowing the projecting lower ends of one of the set of uprights to first rest upon the edge of the side of the wagon, after which the said frame is elevated into a vertical position and by its own weight or gravitation the frame will assume its proper position.

Stretched between the parallel longitudinal bars 5 of the frame and secured to the same by staples 8, is a wire netting 9 which covers the entire space formed between said bars and supports 3, the said staples being employed about the twisted portions of the wire forming the mesh of the wire netting.

As before stated a frame constructed according to my invention is sufficiently yielding and will not shell the corn from the cob when the same is thrown against the guard in filling the wagon to which said guard is attached, and while the frame is very light in weight a very durable construction is obtained.

From the foregoing description it will be seen that by removing the bolts 6, the supports or uprights are released from the ends of the longitudinal parallel bars of the guard permitting the wire netting, together with the bars attached thereto to be conveniently rolled up for shipment or storage. It is further to be noted that when it is desired to fold or roll the guard when not in use only one of the bolts connecting each of the pairs of uprights or supports may be removed, whereby the said uprights can be turned upon the longitudinal bars without disconnecting the latter, the supports being rolled up within the wire netting.

What is claimed is:

A grain guard comprising a pair of bars having eyes formed in their ends, a wire netting member secured to and connecting the said bars, bolts engaged in the eyes of the bars, and uprights disposed on each end of the bars and having the bolts of the bars passing therethrough, whereby the uprights serve to normally support the bars and hold the same in spaced relation, while the removal of the bolts of one of the bars permits of the swinging of the uprights to lie in alinement with the other bar so that the parts may be rolled up within the wire netting.

In testimony whereof I affix my signature, in presence of two witnesses.

OSCAR W. WIGGINS.

Witnesses:
D. HOSLER,
GEO. MINFORD.

Copies of this patent may be obtained for five cents each, by addressing the "Commissioner of Patents, Washington, D. C."